(12) United States Patent
Vogt (10) Patent No.: US 7,305,473 B2
(45) Date of Patent: Dec. 4, 2007

(54) PROVISION OF TRANSPARENT PROXY SERVICES TO A USER OF A CLIENT DEVICE

(75) Inventor: David Vogt, Westlake Village, CA (US)

(73) Assignee: The Coca-Cola Company, Atlanta, GA (US)

( * ) Notice: Subject to any disclaimer, the term of this patent is extended or adjusted under 35 U.S.C. 154(b) by 1247 days.

(21) Appl. No.: 09/819,521

(22) Filed: Mar. 27, 2001

(65) Prior Publication Data

US 2001/0037292 A1 Nov. 1, 2001

Related U.S. Application Data

(63) Continuation-in-part of application No. 09/579,787, filed on May 26, 2000, now Pat. No. 7,006,993.

(60) Provisional application No. 60/136,734, filed on May 28, 1999.

(51) Int. Cl.
 *G06F 15/16* (2006.01)
(52) U.S. Cl. .................. 709/227; 709/201; 709/218
(58) Field of Classification Search ............... 709/200, 709/203, 204, 227, 229, 238, 245, 246, 275, 709/218–226, 213, 248, 252, 210, 204.217, 709/316, 330; 705/41; 713/201, 200; 714/57; 345/764; 719/313; 707/4; 370/431; 704/270
 See application file for complete search history.

(56) References Cited

U.S. PATENT DOCUMENTS

| | | | | |
|---|---|---|---|---|
| 4,454,414 A | 6/1984 | Benton | ..................... | 235/379 |
| 4,654,793 A | 3/1987 | Elrod | ..................... | 364/401 |
| 4,725,719 A | 2/1988 | Oncken et al. | ............. | 235/487 |
| 4,837,422 A | 6/1989 | Dethloff et al. | ............. | 235/380 |
| 4,859,837 A | 8/1989 | Halpern | ..................... | 235/380 |
| 4,906,828 A | 3/1990 | Halpern | ..................... | 235/379 |
| 4,968,873 A | 11/1990 | Dethloff et al. | ............. | 235/380 |
| 5,133,053 A * | 7/1992 | Johnson et al. | ............. | 709/223 |
| 5,287,269 A | 2/1994 | Dorrough et al. | ........... | 364/408 |

(Continued)

OTHER PUBLICATIONS

Optimizing TCP Forwarder Performance—Spatscheck, Hansen, Hartman.. (1998) ftp.cs.arizona.edu/reports/1998/TR98-01.ps.*

(Continued)

*Primary Examiner*—Thong Vu
(74) *Attorney, Agent, or Firm*—Finnegan, Henderson, Farabow, Garrett & Dunner, L.L.P.

(57) ABSTRACT

A proxy server for providing transparent proxy services to a user of a client device is provided. The proxy server receives a request from a browser for a unit of digital content, requests the unit of digital content from a remote server, receives the unit of digital content from the remote server, parses the unit of digital content for references to the remote server, identifies a reference within a software construct, inserts a software function into the modified remote page for modifying references, inserts a call to the software function into the software construct, modifies references to the remote server in the unit of digital content to form a modified unit of digital content by inserting a surrogate server hostname into the references and removing a remote server hostname from the references, and transmits the modified unit of digital content to the browser.

88 Claims, 3 Drawing Sheets

U.S. PATENT DOCUMENTS

| | | | |
|---|---|---|---|
| 5,321,241 A | 6/1994 | Craine | 235/380 |
| 5,326,960 A | 7/1994 | Tannenbaum | 235/379 |
| 5,350,906 A | 9/1994 | Brody et al. | 235/379 |
| 5,408,082 A | 4/1995 | Takagi et al. | 235/492 |
| 5,450,477 A | 9/1995 | Amarant et al. | 379/93 |
| 5,500,513 A | 3/1996 | Langhans et al. | 235/380 |
| 5,530,232 A | 6/1996 | Taylor | 235/380 |
| 5,559,313 A | 9/1996 | Claus et al. | 235/380 |
| 5,566,327 A | 10/1996 | Sehr | 395/600 |
| 5,578,808 A | 11/1996 | Taylor | 235/380 |
| 5,581,663 A | 12/1996 | Zlotin et al. | 395/51 |
| 5,621,201 A | 4/1997 | Langhans et al. | 235/380 |
| 5,727,145 A * | 3/1998 | Nessett et al. | 713/200 |
| 5,751,956 A | 5/1998 | Kirsch | 395/200.33 |
| 5,774,870 A | 6/1998 | Storey | 705/14 |
| 5,793,965 A * | 8/1998 | Vanderbilt et al. | 709/203 |
| 5,794,259 A | 8/1998 | Kikinis | 707/507 |
| 5,825,863 A | 10/1998 | Walker | 379/144 |
| 5,835,718 A * | 11/1998 | Blewett | 709/218 |
| 5,864,830 A | 1/1999 | Armetta et al. | 705/14 |
| 5,903,725 A | 5/1999 | Colyer | 709/203 |
| 5,914,472 A | 6/1999 | Foladare et al. | 235/380 |
| 5,941,988 A * | 8/1999 | Bhagwat et al. | 713/201 |
| 5,945,653 A | 8/1999 | Walker et al. | 235/380 |
| 5,953,524 A * | 9/1999 | Meng et al. | 717/108 |
| 5,953,710 A | 9/1999 | Fleming | 705/38 |
| 5,961,593 A * | 10/1999 | Gabber et al. | 709/219 |
| 5,961,601 A * | 10/1999 | Iyengar | 709/229 |
| 5,983,267 A * | 11/1999 | Shklar et al. | 709/217 |
| 5,987,402 A | 11/1999 | Murata et al. | 704/2 |
| 5,987,454 A * | 11/1999 | Hobbs | 707/4 |
| 5,991,795 A | 11/1999 | Howard et al. | |
| 5,991,810 A * | 11/1999 | Shapiro et al. | 709/229 |
| 5,999,596 A | 12/1999 | Walker et al. | 379/91.01 |
| 6,009,412 A | 12/1999 | Storey | 705/14 |
| 6,014,638 A | 1/2000 | Burge et al. | 705/27 |
| 6,018,718 A | 1/2000 | Walker et al. | 705/14 |
| 6,021,943 A | 2/2000 | Chastain | 235/379 |
| 6,029,175 A | 2/2000 | Chow et al. | 707/104 |
| 6,044,360 A | 3/2000 | Picciallo | 705/21 |
| 6,049,821 A * | 4/2000 | Theriault et al. | 709/203 |
| 6,052,730 A * | 4/2000 | Felciano et al. | 709/225 |
| 6,098,172 A * | 8/2000 | Coss et al. | 713/201 |
| 6,101,549 A * | 8/2000 | Baugher et al. | 709/238 |
| 6,108,637 A | 8/2000 | Blumenau | 705/7 |
| 6,108,703 A * | 8/2000 | Leighton et al. | 709/226 |
| 6,134,680 A * | 10/2000 | Yeomans | 714/57 |
| 6,138,162 A * | 10/2000 | Pistriotto et al. | 709/229 |
| 6,173,311 B1 | 1/2001 | Hassett et al. | |
| 6,175,876 B1 * | 1/2001 | Branson et al. | 709/252 |
| 6,182,141 B1 * | 1/2001 | Blum et al. | 709/227 |
| 6,182,226 B1 | 1/2001 | Reid et al. | |
| 6,185,598 B1 * | 2/2001 | Farber et al. | 709/200 |
| 6,185,625 B1 | 2/2001 | Tso et al. | |
| 6,199,077 B1 | 3/2001 | Inala et al. | |
| 6,205,481 B1 * | 3/2001 | Heddaya et al. | 709/226 |
| 6,226,677 B1 * | 5/2001 | Slemmer | 709/227 |
| 6,253,234 B1 * | 6/2001 | Hunt et al. | 709/213 |
| 6,253,253 B1 * | 6/2001 | Mason et al. | 719/315 |
| 6,266,704 B1 * | 7/2001 | Reed et al. | 709/238 |
| 6,295,522 B1 * | 9/2001 | Boesch | 705/41 |
| 6,321,267 B1 * | 11/2001 | Donaldson | 709/229 |
| 6,345,288 B1 * | 2/2002 | Reed et al. | 709/201 |
| 6,353,860 B1 * | 3/2002 | Hare et al. | 719/316 |
| 6,381,628 B1 * | 4/2002 | Hunt | 709/201 |
| 6,389,462 B1 * | 5/2002 | Cohen et al. | 709/218 |
| 6,397,246 B1 * | 5/2002 | Wolfe | 709/217 |
| 6,408,342 B1 * | 6/2002 | Moore et al. | 719/330 |
| 6,427,174 B1 * | 7/2002 | Sitaraman et al. | 709/245 |
| 6,441,834 B1 * | 8/2002 | Agassi et al. | 345/764 |
| 6,473,406 B1 * | 10/2002 | Coile et al. | 370/248 |
| 6,480,508 B1 * | 11/2002 | Mwikalo et al. | 370/475 |
| 6,490,618 B1 * | 12/2002 | Ferguson et al. | 709/223 |
| 6,546,425 B1 * | 4/2003 | Hanson et al. | 709/227 |
| 6,553,410 B2 * | 4/2003 | Kikinis | 709/218 |
| 6,553,413 B1 * | 4/2003 | Leighton et al. | 709/219 |
| 6,591,306 B1 * | 7/2003 | Redlich | 709/245 |
| 6,594,692 B1 * | 7/2003 | Reisman | 709/219 |
| 6,687,732 B1 * | 2/2004 | Bector et al. | 709/200 |
| 6,687,739 B2 * | 2/2004 | Anupam et al. | 709/204 |
| 6,732,361 B1 * | 5/2004 | Andreoli et al. | 719/313 |
| 6,822,955 B1 * | 11/2004 | Brothers et al. | 370/389 |
| 6,826,626 B1 * | 11/2004 | McManus | 709/246 |

OTHER PUBLICATIONS

Experience With Top Gun Wingman: A Proxy-Based..—Fox, Goldberg.. (1998) ; now.cs.berkeley.edu/~gribble/papers/wingman.ps.gz.*

W3C Journal vol. 1 No. 4 ; www.w3j.com/4/s3.lamer.html.*

Extended IDL Help; www.boulder.swri.edu/~buchlin/sswidlhelp/trace/ops.html.*

SecurityFocus HOME Advisories: SNMPD default writable community string; www.securityfocus.com/advisories/2083.*

SunVTS Quick Reference Card; docs-pdf.sun.com/806-1028-10/806-1028-10.pdf.*

Extending the Remote Exchange framework to suit instance-based..— Vermeer (1996) ftp.usc.edu/pub/csinfo/tech-reports/papers/96-643.ps.Z.*

Just-In-Time Stub Generation—Hof (1997) ftp.ssw.uni-linz.ac.at/pub/Papers/stub.ps.Z.*

Unsupervised Surrogate Agents and Search Bias Change in..—Sandip Sen (1995) ftp.eecs.umich.edu/people/durfee/icmas95-sd.ps.Z.*

Adaptive Surrogate Agents—Sandip Sen (1994) ftp.eecs.umich.edu/people/durfee/daiw94-sd.ps.Z.*

A general model and mechanisms for model-level heterogeneous RPC interoperability Stoyenko, A.D.; Parallel and Distributed Processing, 1990. Proceedings of the Second IEEE Symposium on Dec. 9-13, 1990 pp. 668-675.*

Proxies, application interfaces, and distributed systems Dave, A.; Sefika, M.; Campbell, R.H.; Object Orientation in Operating Systems, 1992., Proceedings of the Second International Workshop on Sep. 24-25, 1992 pp. 212-220.*

The design and implementation of a distributed object-oriented knowledge-based system for hierarchical simulation modeling Huang, Y.-M.; Duan, Y.-S.; AI, Simulation, and Planning in High Autonomy Systems, 1993. 'Integrating Virtual Reality and Model-Based Environments'. Proceedings. Fourth Annual Conference Sep. 20-22, 1993 pp. 164-170.*

"Sinton, P., "Visa Wants To Kill Cash. It hopes "smart cards" will become the payment method of choice", *San Francisco Chronicle*, Oct. 11, 1995, p. B1.

Heady, R., "Brokers Compete With Lenders", *The Denver Post*, Nov. 19, 1995, p. J-14.

Garfinkel, S., "Companies Rush To Say Buy-Buy Over Net", *San Jose Mercury News*, Oct. 1, 1996.

Landbert, M., "Verifone Wants To Plug In To Cash", *San Jose Mercury News*, Oct. 1, 1996.

Swenson, Jr., "Filing Expenses Via American Express", *Information Week*, Jul. 1, 1996, p. 103.

Gianturco, M., "Digital Cash", *Forbes*, Aug. 14, 1995, p. 164.

Hoffman, T., "The Check's In The E0-Mail; Banks Plan Electronic Payment System", *Computerworld*, Sep. 4, 1995.

"New Web Site Enables Teens and Kids to Shop and Save Online", ICanBuy Press release, Jan. 26, 1999.

"FSU Smart Card eases campus life here and around the country", *FS-Times*, vol. 1, Issue 3, Apr. 1996.

"Florida State University", from website www.itc.icl.ie/products/smartcard/ems/fsucase.htm, Sep. 1996.

"Florida State University", from website www.fujitsu.com.au/products/cards/florida.htm, 1996, 2 pages.

"Florida State University AEs FSUCard—A MultiPurpose Identification Card", from website www.house.gov/castle/banking/norwood3.htm, Jul. 10, 1996, 4 pages.

"Smart Card—FSU Thanks Smart", *Nole Notes*, vol. VI, No. 4, Sep. 1996.

Saker, R., "This year the War Department aims for fairer FSU Card fees", *Florida Flambeau*, Feb. 12, 1997.

Berinato, S., "Smart cards move to head of class", *PCWeek Online*, Mar. 24, 1997, 4 pages.

Knowles, R., "The future of technology could find roots in Tallahassee, FSU", *Florida Flambeau*, Apr. 15, 1997, 2 pages.

"Smart card marches on", *FS-Times*, vol. 1, Issue 6, Sep. 1996.

\* cited by examiner

PROVISION OF TRANSPARENT PROXY SERVICES TO A USER OF A CLIENT DEVICE

RELATED APPLICATION INFORMATION

This application claims the benefit of U.S. Provisional Application Ser. No. 60/136,734, filed May 28, 1999, which is incorporated herein by reference.

This application is a continuation-in-part of U.S. Application Ser. No. 09/579,787, filed May 26, 2000, now U.S. Pat. No. 7,006,993, and entitled "Method And Apparatus For Surrogate Control Of Network-Based Electronic Transactions," which is incorporated herein by reference.

BACKGROUND OF THE INVENTION

1. Field of the Invention

This invention relates to proxy services provided on a network.

2. Description of Related Art

The rapid growth and expansion of network and Internet technologies has facilitated electronic commerce transactions, particularly in the area of consumer retail goods. Taking advantage of the widespread availability of the Internet, numerous retailers have gone online with retail shopping sites on the World Wide Web. These sites allow consumers to shop easily and conveniently from the comfort of their homes and offices. However, access to electronic shopping is limited to those possessing specific forms of credit or cash that can be transferred electronically.

Numerous non-cash techniques are typically used for executing purchase transactions among purchasers and online merchants. Indeed, numerous types of credit cards and banking cards are in widespread use. For example, a credit card can be used to effect online purchases, with the transaction being paid for by a credit card clearing house or bank and creating a credit obligation for the owner of the credit card. Another type of card which looks like a credit card but functions differently is the debit card. The debit card is used much like a credit card in that it is tendered by the purchaser to an online merchant for payment. Payment is effected from a bank to the merchant and the funds are deducted directly from the card holder's bank account.

However, the problem with credit cards and debit cards is that certain conditions have to be met for issuance, conditions that can include restrictions on age and financial criteria. As a result, many consumers do not meet the requirements for credit card or debit card issuance, thereby eliminating them from the ranks of online shoppers. Furthermore, the negative security implications associated with exposing credit card or debit card account numbers over a public network like the Internet make many consumers uncomfortable. Thus, while many of these consumers have the technology and financial resources available, they are put out of reach of online merchants because they do not have a particular form of financial resources.

As an alternative to cash and credit cards, stored value cards are now available. Stored value cards require the purchase of a card which looks much like a credit card, but which has a limited amount of available value to be spent. The balance is contained in a magnetic strip or computer chip in the card. As the stored value card is used, the remaining balance on the card is depleted. However, like some debit cards, stored value cards do not enjoy the functionality of credit cards in many business transactions, particularly electronic commerce purchases.

One possible solution to this problem for some, particularly minor children, is found in secondary credit cards. A credit card holder may obtain one or more secondary credit cards from the issuer, as for example for family members, that are linked to the main credit card. The secondary credit cards are functionally identical to the main credit card in all respects and, indeed, typically bear the same account number and differ from the primary card only in the name of the person who is authorized to use the secondary card. Any purchases made with the secondary credit cards are debited against the credit limit of the single account in which the primary and secondary cards are issued. Thus, the main or primary cardholder has no control over the spending power or abilities of the secondary credit cards linked to his card, beyond the fact that the total of all debts incurred by all cards on the account cannot exceed the credit limit of the main credit card.

These secondary credit cards, therefore, are problematic because the secondary cardholders can quickly accumulate a significant outstanding balance on the main credit card account, thus reducing the main cardholder's spending power. Most importantly, the main cardholder is not aware of the decrease in the available credit or spending limit as a result of expenditures by a secondary cardholder. Consequently, there is a need for a system or service that enables those without a credit card, for example teenage children, to shop and buy at online merchants without requiring a credit card.

A typical proxy server operates as a non-transparent proxy where the browser knows it is using a proxy.

SUMMARY OF THE INVENTION

In some embodiments, a method of providing transparent proxy services to a user of a client device is provided. The client device has a browser for retrieving digital content from a data network. The client device, a proxy server and a remote server are connected to the data network. According to the method, the proxy server receives a first request from the browser for a first unit of diqital content, wherein there is a remote server hostname associated with the remote server and the first request includes the remote server hostname for referencinq the first unit of diqital content; the proxy server requests the first unit of diqital content from the remote server; the proxy server receives the first unit of diqital content from the remote server; the proxy server parses the first unit of diqital content for references to the remote server; the proxy server identifies a first reference within a software construct, wherein the software construct, when performed, would force a paqe reload by the browser; the proxy server inserts a first software function into the modified remote paqe for modifyinq references; the proxy server inserts a call to the first software function into the software construct, wherein the first reference is encapsulated in the function call; the proxy server modifies at least one reference to the remote server in the first unit of diqital content to form a modified first unit of diqital content by insertinq a surroqate server hostname into the at least one reference and removinq a remote server hostname from the at least one reference, wherein the surrogate server hostname is different from the remote server hostname; and the proxy server transmits the modified first unit of digital content to the browser.

According to other aspects of the invention, a proxy server provides transparent proxy services to a user of a client device and a computer program provides transparent proxy services to a user of a client device.

Still further objects and advantages attaching to the system and methods will be apparent to those skilled in the art from the following particular description.

DESCRIPTION OF THE DRAWINGS

Further objects of this invention, together with additional features contributing thereto and advantages accruing therefrom, will be apparent from the following description of an embodiment of the present invention which is shown in the accompanying drawings with like reference numerals indicating corresponding parts throughout and which is to be read in conjunction with the following drawings, wherein.

DETAILED DESCRIPTION OF THE INVENTION

Throughout this description, the embodiments and examples shown should be considered as exemplars, rather than limitations on the apparatus and methods of the present invention.

In accordance with the invention, proxy services are provided transparently to a user browsing a web site. The method and apparatus of the invention are useful in providing a user with a means for making on line purchases without a credit card account, debit account or other financial account recognized by the respective merchants.

One advantage of the invention is that special software is not required to be installed on either the client (user) or merchant end of a transaction. As such, spenders and funders are not required to install any software on their personal computers in addition to a typical browser. Also, the online merchants are not required to install any special server software or modify their web pages in order to accommodate the surrogate transactions.

The System of the Invention

Figure 1:
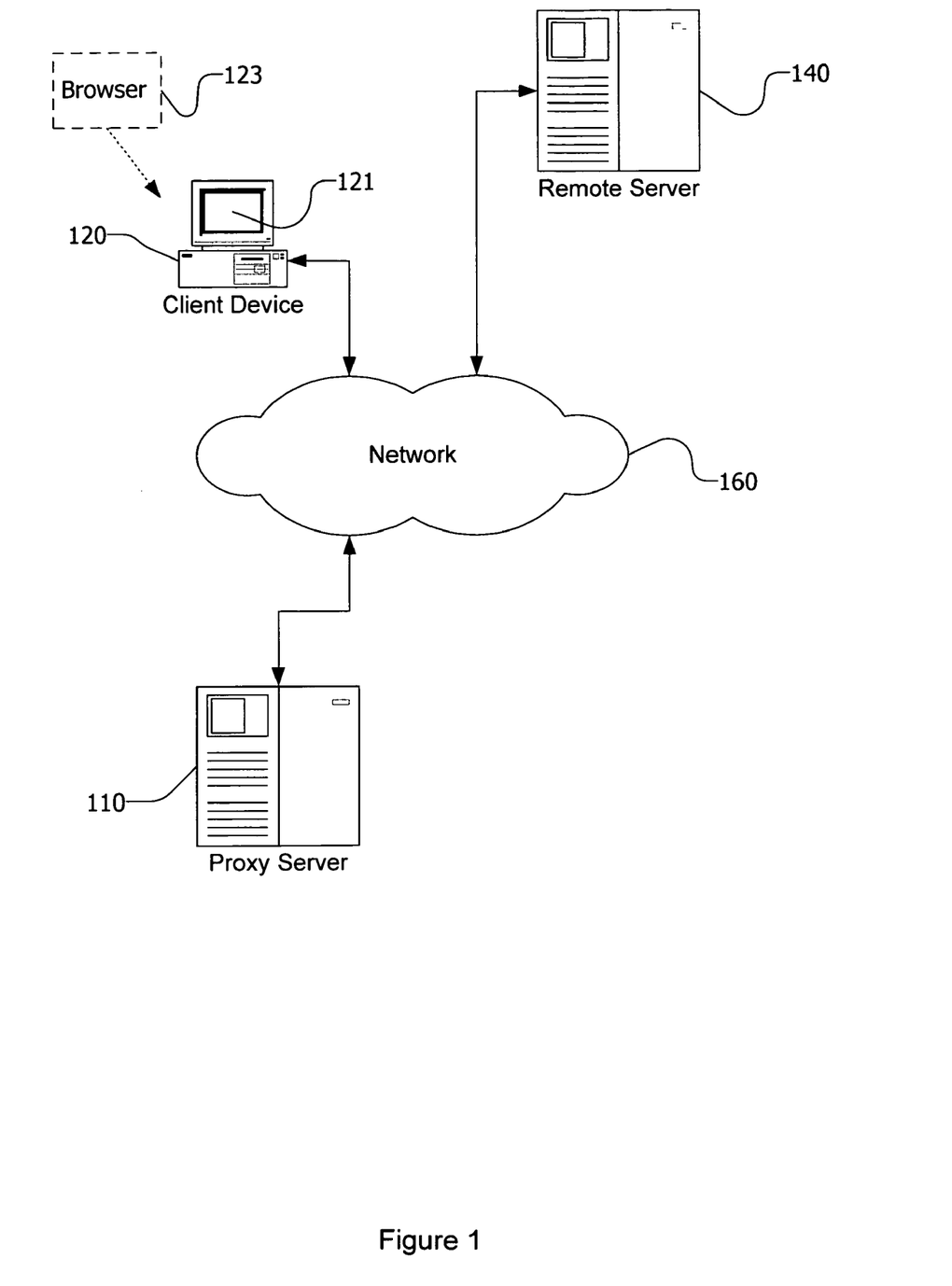
FIG. 1 is a block diagram of a system for providing transparent proxy services to a user browsing a remote server in accordance with the invention.

FIG. 1 is a block diagram of a system including a proxy server 110, client device 120, remote server 140. A data network 160 interconnects the other components 110, 120, 140. Different components of the proxy server 110 can be located at different physical locations. The system may include more than one client device 120 and remote server 140.

The client device 120 comprise a computer configured to connect to the network 160 for accessing servers such as the remote server 140. The client device 120 may be, for example, a PC running a Microsoft Windows operating system, an Internet appliance, network computer (NC), or an appropriately Internet-enabled device such as a portable digital assistant (PDA), mobile phone, refrigerator, etc. The particular type of device of the client device 120 is not considered to be important. The client device 120 operates a browser program 123 for accessing and interacting with other systems. For a PC, this program is a web browser such as Microsoft Internet Explorer or Netscape Navigator, and may generate a browser display 121 on the client device 120. The program used by the client device 120 for accessing and interacting with other systems to obtain digital content from the other systems will be generally referred to herein as the "browser" 123.

The remote server 140 comprises a server or collection of servers which provide online functionality, such as an online retail shopping web site. An identifier is associated with the remote server 140 to allow the remote server 140 and digital content on the remote server 140 to be identified from the data network 160. For TCP/IP networks, the identifier may be a hostname, which is unique within the network. In some cases, the hostname is the same as the domain name.

The remote server 140 may be accessed and utilized, for example, by the browser 123. Units of digital content (e.g., web pages) served by the remote server 140 will be referred to herein as "remote pages." An identifier may be associated with each remote page to allow the remote pages to be identified from the data network 160. Other identifiers may be associated with other objects on the remote server, such as graphic files, to allow these other objects to be identified from the data network 160. When used, these identifiers may be considered "references" to the respective host (i.e., remote server), web page or other object.

For TCP/IP networks, an identifier or reference may be a uniform resource locator (URL), and in some circumstances a fully qualified URL. A "fully-qualified" URL includes a complete URL, and is in the form http://hostname/url or "//hostname/url". For a World Wide Web page, this means that the URL includes a hostname plus a path plus the name of the resource. For example, consider a web page named "item.html". Consider too a path for that web page named "shopping/product". Further consider that the host for the web page is www.uspto.net. Thus, the full-qualified link to this web page is http://www.uspto.net/shoppinQ/product/item.html.

The data network 160 may include the Internet, local area networks, wide area networks, wired networks, and wireless networks. Separate networks may be provided for interconnecting the other components 110, 120, 140.

The proxy server 110 comprises a server or collection of servers which provide the functionality described herein, primarily through software. Like the remote server 140, the proxy server 110 may be accessed and utilized, for example, by the browser 121. An identifier is associated with the proxy server 110 to allow the proxy server 110 and digital content on the proxy server 110 to be identified from the data network 160. For TCP/IP networks, the identifier may be a hostname, which is unique within the network.

The proxy server 110 operates transparently between the client device 120 and the remote server 140. This means that the user of the client device 120 does not know that the proxy server 110 is intercepting the electronic traffic between the client device 120 and the remote server 140. The proxy server 110 communicates with the browser 123 and the remote server 140 in providing remote pages back to the browser 123. The proxy server 110 may cache the remote pages, wherein the browser 123 explicitly returns to the proxy server 110 which specifies the remote page or pages to hit. Caching may increase the speed of subsequent page hits.

As described further below, when a user wishes to access or utilize the remote server 140, the user is redirected to the proxy server 110, which proxies all the information from the remote server 140 in real time. The proxy server 110 may ensure that:

the current user is a valid user;

user interaction with the remote server 140 always returns control back to the proxy server 140;

HTTP cookies are processed and proxied;

forms on the remote server 140 are automatically filled out; and selected information such as credit card numbers are not available to the client device 120.

The Methods of the Invention

The methods of the invention may be practiced by a user shopping at the remote server 140. As described in our co-pending application identified above, a user may register with a surrogate shopping service, and indicate that he wishes to begin shopping at the remote server 140 from a web site of the surrogate system. This may then cause the proxy server 110 to become involved. In such circumstances, it may be desirable to modify remote pages before they are provided to the browser 123. For example, to ensure that the proxy server 110 always has control, the proxy server 140 may modify remote pages so that if the user clicks on a hyperlink on the modified remote page, the modified remote page causes the browser 123 to return to a server of the surrogate system, such as the proxy server 110.

Figure 2:
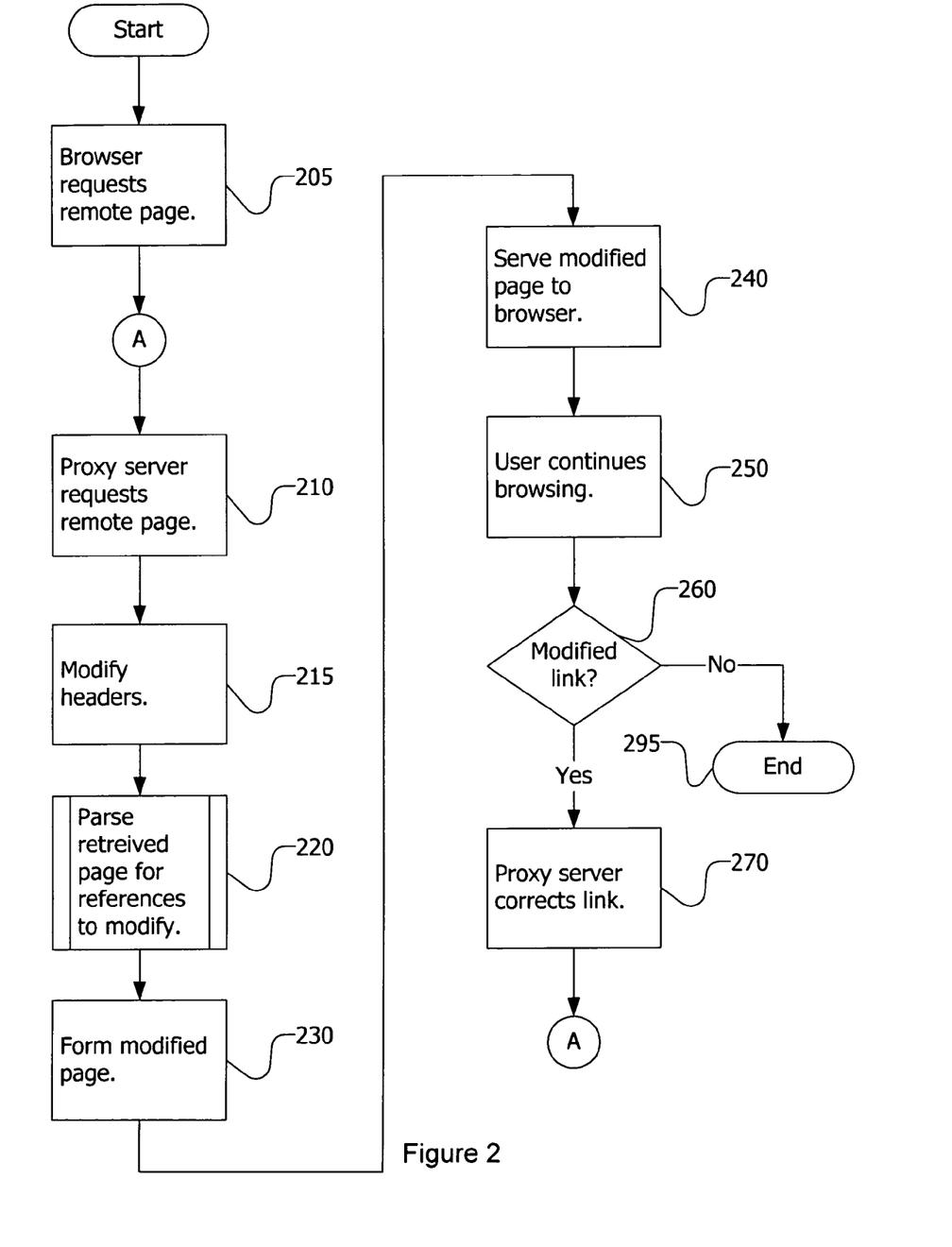
FIG. 2 is a flow chart of a method of providing transparent proxy services in accordance with the invention.

Referring now to FIG. 2, there is shown a flow chart of a method of providing transparent proxy services in accordance with the invention. After the user has requested a remote page from the proxy server 110 (step 205), the proxy server 110 may request the requested remote page from the remote server 140 (step 210). In response, the remote server 140 may transmit the remote page to the proxy server 110.

The remote server 140 may precede the remote page with one or more headers. Headers are commonly used in HTTP. The headers may include references to the remote server 140 which should be modified (step 215). Certain kinds of headers may cause a new page to be loaded. Two such HTTP headers are "Location" and "Content-Location". If there is a "Location" header, the proxy server 110 may modify the hostname in the Location header. If there is a "Content-Location" header, the proxy server 110 may modify the hostname in the Content-Location header.

These modifications and others described below may be made in a number of ways. These modifications generally take the form of inserting a surrogate server hostname into references to the remote server hostname, and/or replacing the remote server hostname with the surrogate server hostname. The surrogate server hostname may be the same as the proxy server hostname, or it may be a hostname of another server of the surrogate system. The following discussion will include examples of how TCP/IP and HTTP references may be modified, along with actual examples of how the modifications would appear. In these examples, it is assumed that the hostname of the proxy server 110 is "irs.com", the hostname of the remote server 140 is "uspto.net" and the reference to the remote server 140 is a fully qualified URL or hyperlink such as http://www.uspto.net/shopping/product/item.html.

In one manner of modification, the surrogate server hostname is appended to the hostname of the remote server 140. In the example, the modified reference is http://www.uspto.net.irs.com/shopping/product/item.html.

In another manner of modification, the surrogate server hostname is inserted into reference to the remote page and the hostname of the remote server 140 is made part of the local path. Here, the reference is modified so that the surrogate server hostname is the only hostname in the reference. In the example, the modified reference is http://irs.com/www.uspto.net/dir/file.html. In this case, when the proxy server 110 receives a request with such as reference, the surrogate server hostname can be stripped out, and the hostname of the remote server 140 can be drawn from the front of the path.

A third manner of modification is a variation of the second manner of modification, just described. In this modification, two or three additional changes are made. First, the hostname of the remote server 140 is made to read backwards. In the example, the modified reference is http://irs.com/ten.otrsu.www/shopping/prodct/item.html.

Second, periods (".") are changed to slashes ("/") in the hostname of the remote server 140. In the example, the modified reference is http://irs.com/ten/otpsu/www/shoppinQ/product/item.html. A separator, such as a caret ("^") may be inserted between the reversed hostname of the remote server 140 and the remainder of the path. In the example, the modified reference is http://irs.com/ten/otpsu/^/shopping/product/item.html.

It is well know that a cookie may be passed within a header. For such "Set-cookie" headers, the proxy server 110 may modify the "domain" portion of the cookie if it exists. The third manner of modification, just described, provides an effective way to manage cookies that are passed between the browser 123 and the remote server 140. When cookies are passed from the remote server 140 to the browser 123, they contain an optional domain name and path specification. The browser 123 uses these values to determine whether or not to send the cookies back to the remote server 110 on subsequent requests. Since the remote server 110 is proxied by the (single) surrogate server hostname (e.g., proxy.rocketcash.com), the hostname information in the cookie cannot be used. However, since the hostname information for the remote server 140 is specified as the initial segments of the URL path, the browser 123 can emulate the hostname functionality by writing the hostname information into the path specifier for the cookie.

For example, if the domain specifier for a cookie is ".netzero.net", the equivalent path specifier would be the reversed version (again, replacing periods with slashes) which would be "/ten/orezten/". The domain specifier for the cookie can then be removed. Since the path specifier for the cookie now contains the original domain information, the original path information is prepended to the cookie value and terminated with a "^" separator. For example, if the cookie value is "data" and the path is "/images", the new cookie value would be "/images^data".

Using this technique, the browser 123 sends cookies that are appropriate for the current remote domain, but this may include cookies that would otherwise not have been sent if the original path did not match the URL path. As cookies are sent from the browser 123 back to the remote server 140, the proxy server 110 removes the original path information from the cookie value and compares that path with the path of the current URL. If the path from the cookie matches the initial path of the current URL, the cookie is forwarded to the remote server 140, otherwise it is removed from the HTTP header.

After the headers have been modified (step 215), the proxy server 110 may parse the remote page for references (step 220). References in the remote page may then be modified in the manner described above to form a modified requested web page (step 225).

In the next step of the method, the proxy server 110 serves the modified remote page to the browser 123 (step 240). The user may then continue browsing as before (step 250).

If the user selects a modified link in the modified remote page (step 260), then the browser 123 requests the page identified by the modified link from the surrogate server (e.g., the proxy server 110). The surrogate server should ensure that the remote page which the browser 123 expected is served properly to the browser 123. Based on the hostname of the modified link, the surrogate server knows that the user actually wants a remote page. Thus, the surrogate server strips off the surrogate server's own hostname from the hostname in the modified link to form a corrected link (step 270). The surrogate server may perform additional processing of the request from the browser 123. For example, the surrogate server may remove its hostname from the complete remote hostname, and the new hostname name may be used as the target of the proxy operation. Also, because some sites use the http "Referer" header for navigation, the surrogate server may remove its hostname from the "Referer" header.

Next, the proxy server 110 requests the remote page identified by the corrected link from the remote server 140 (step 210), and processing can continue as described above.

Figure 3:
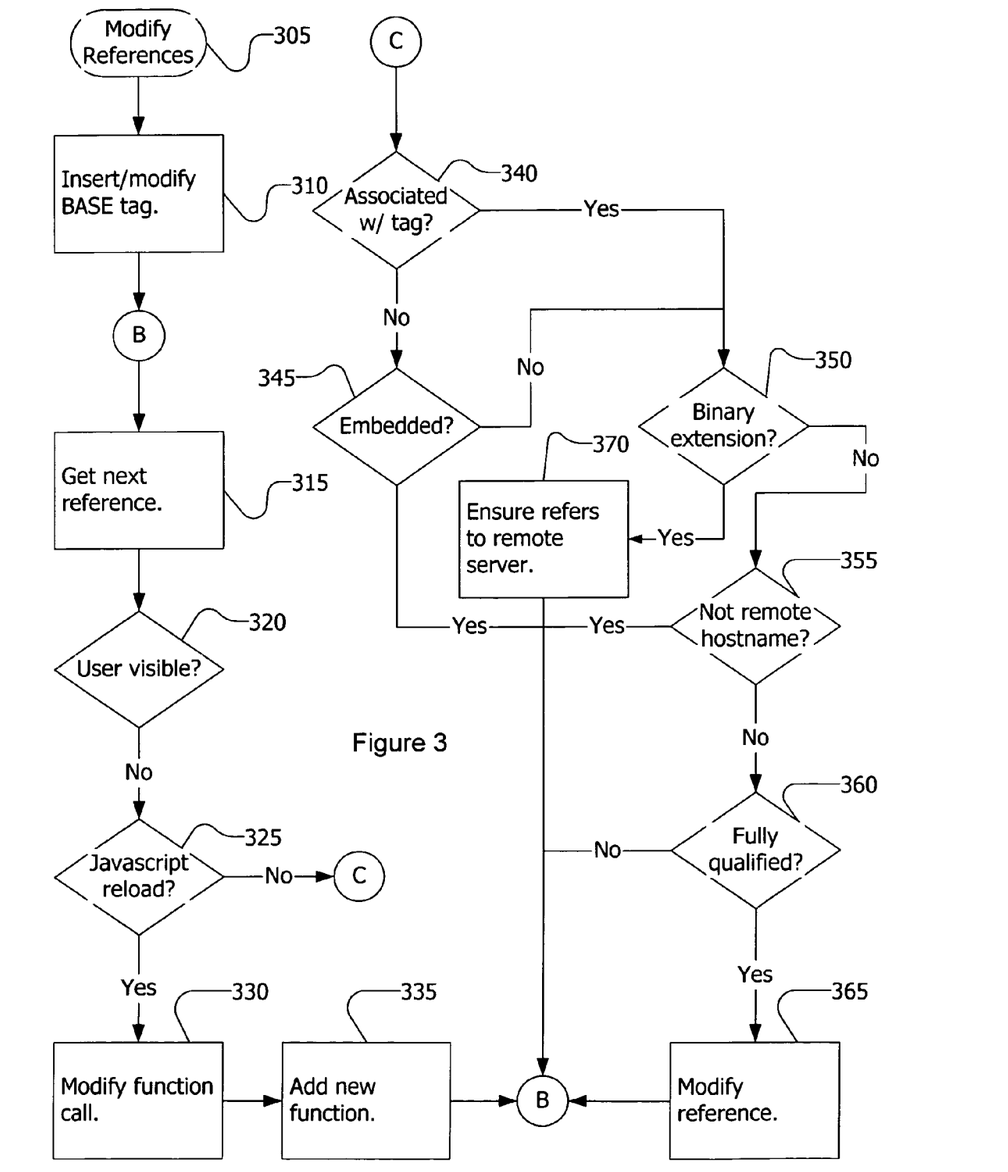
FIG. 3 is a flow chart of a method of modifying a web page in accordance with the invention.

Referring now to FIG. 3, there is shown a method of modifying references in a remote page in accordance with the invention to thereby form a modified page. According to this method, references such as URLs may be modified in the manner described above. These references may be within an HTML tag or within a javascript region. With the start of the method (step 305), the remote page is loaded and made ready for parsing and modification.

One useful modification is to have a tag at the top of the modified page which provides a general reference to the proxy server hostname (step 310). If the remote page is a web page which already has a <BASE HREF=""> tag, the existing HREF value may be modified to point to the proxy server. If there is no such tag, then a <BASE HREF=""> tag may be inserted into the top of the modified page, and set to point to the fully qualified URL of the current page, but modified to point to the proxy server. Alternatively, relative and absolute references may be modified to be fully qualified, and refer to the proxy server.

The modified page may be then parsed for references (step 315), so that the references may be modified, if desired. Parsing may be done from top to bottom. If a reference is to be displayed by the browser and therefore would be visible to the user, it generally need not be modified (step 320). In general, references which are not within an HTML tag or within a javascript region are user visible.

If a reference is within a block of javascript code, it may be desirable to modify the reference. A javascript construct that can force a page reload (step 325) may be modified such that the reference is encapsulated in a call to a special function (step 330). The special function may be added to the modified page, with the special function implementing the appropriate modifications to the operand of the construct (step 335). The operand may be a URL, a function or an expression. For example, constructs such as ".location.replace(operand)", ".location=operand" and ".location.href=operand" may be modified respectively to ".location.replace($_{13}$rcFunc(operand))", ".location=$_{13}$rcFunc(operand)" and ".location.href=$_{13}$rcFunc(operand)". Given a fully qualified, absolute, or relative URL, the rcFunc() call may implement the modifications described herein.

The decision of whether to modify a reference may depend in part on why the reference is present. If the reference is associated with an HTML tag such as <SRC="">, <HREF="">, <ACTION="">, "<META CONTENT='#;URL'>" (step 340), then the reference may be modified. If the reference appears to be embedded in another reference (i.e., an argument to another reference) (step 345), the reference need not be modified.

The decision of whether and how to modify a reference may also depend in part on the type of reference. If the reference ends with an extension indicating that the content is binary data (e.g., .gif, .jpg) (step 350), then the reference should refer to the remote server, and may need to be modified accordingly (step 370).

If the reference includes a hostname for other than that of the remote server 140 (step 355), then the reference probably need not be modified. This may occur, for example, if the remote page has an advertiser link to another web site. On the other hand, it may be undesirable to permit the user to browse to another web site. Thus, the reference may be modified to provide an error message to the user if the user selects the corresponding link.

If a reference is not fully qualified (step 360)—a relative reference (e.g., "product/item.html") or an absolute link relative to the root (e.g., "/shopping/product/item.html"), it probably need not be modified. This is because the browser will hit the proxy server 10 for relative and absolute links to the root.

Once it has been determined that a reference should be modified, the modifications may be made in the manner described above (step 365). This process may continue until all references have been considered.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of providing transparent proxy services to a user of a client device, the client device having a browser for retrieving digital content from a data network, wherein the client device, a proxy server and a remote server are connected to the data network, the method comprising:

the proxy server receiving a first request from the browser for a first unit of digital content, wherein there is a remote server hostname associated with the remote server and the first request includes the remote server hostname for referencing the first unit of digital content;

the proxy server requesting the first unit of digital content from the remote server;

the proxy server receiving the first unit of digital content from the remote server;

the proxy server parsing the first unit of digital content for references to the remote server;

the proxy server identifying a first reference within a software construct, wherein the software construct, when performed, would force a page reload by the browser;

the proxy server inserting a first software function into the modified remote page for modifying references;

the proxy server inserting a call to the first software function into the software construct, wherein the first reference is encapsulated in the function call;

the proxy server modifying at least one reference to the remote server in the first unit of digital content to form a modified first unit of digital content by inserting a surrogate server hostname into the at least one reference and removing a remote server hostname from the at least one reference, wherein the surrogate server hostname is different from the remote server hostname; and the proxy server transmitting the modified first unit of digital content to the browser.

2. The method of providing transparent proxy services to a user of a client device of claim 1, wherein there is a proxy server hostname associated with the proxy server, and the surrogate server hostname is the proxy server hostname.

3. The method of providing transparent proxy services to a user of a client device of claim 1, the method further comprising the proxy server receiving a second request from the browser for a second unit of digital content, wherein the second request identifies the surrogate server hostname as a source of the second unit of digital content.

4. The method of providing transparent proxy services to a user of a client device of claim 3, the method further comprising:

the proxy server modifying the second request to a modified second request by removing the surrogate server hostname from the second request; and the proxy server transmitting the modified second request to the remote server.

5. The method of providing transparent proxy services to a user of a client device of claim 1, wherein the remote server comprises a web server and the data network utilizes TCP/IP and HTTP protocols, the modifying step comprising appending the surrogate server hostname to the remote server hostname in the at least one reference.

6. The method of providing transparent proxy services to a user of a client device of claim 1, wherein the remote server comprises a web server and the data network utilizes TCP/IP and HTTP protocols, wherein the at least one reference includes a local path, the modifying step comprising:

inserting the surrogate server hostname into the at least one reference in place of the remote server hostname; and making the remote server hostname server part of the local path of the at least one reference.

7. The method of providing transparent proxy services to a user of a client device of claim 6, wherein the remote server hostname comprises plural characters, the modifying step further comprising reversing the characters in the remote server hostname to thereby make the remote server hostname read backwards.

8. The method of providing transparent proxy services to a user of a client device of claim 7, wherein the remote server hostname includes one or more periods ("."), the modifying step further comprising changing the periods to slashes ("/") in the reversed remote server hostname.

9. The method of providing transparent proxy services to a user of a client device of claim 7, the modifying step further comprising inserting a separator between the reversed hostname of the remote server and the remainder of the path.

10. The method of providing transparent proxy services to a user of a client device of claim 9 wherein the separator comprises a caret ("^").

11. The method of providing transparent proxy services to a user of a client device of claim 1, the method further comprising inserting a base reference tag pointing to the surrogate server into the modified remote page.

12. The method of providing transparent proxy services to a user of a client device of claim 1, the method further comprising determining if a base tag is present in the remote page, and if so, then modifying the base tag to point to the surrogate server by replacing the remote server hostname with the surrogate server hostname.

13. The method of providing transparent proxy services to a user of a client device of claim 1, the parsing step comprising identifying a first reference, wherein the first reference is to be displayed by the browser and therefore would be visible to the user, the method further comprising not modifying the first reference.

14. The method of providing transparent proxy services to a user of a client device of claim 1, the parsing step comprising identifying a first reference which is associated with any of the following HTML tags: <SRC="">, <HREF="">, <ACTION="">, "<META CONTENT='#;URL'>"; and the modifying step comprising modifying the first reference.

15. The method of providing transparent proxy services to a user of a client device of claim 1, the parsing step comprising identifying a first reference, wherein the first reference ends with an extension indicating that content identified by the first reference is binary data, the method further comprising not modifying the first reference.

16. The method of providing transparent proxy services to a user of a client device of claim 1, the parsing step comprising identifying a first reference, wherein the first reference includes a hostname other than the remote server hostname, the method further comprising not modifying the first reference.

17. The method of providing transparent proxy services to a user of a client device of claim 1, the parsing step comprising identifying a first reference, wherein the first reference includes a hostname other than the remote server hostname and the first reference comprises a link, the modifying step comprising modifying the reference to provide an error message to the user if the user selects the link.

18. The method of providing transparent proxy services to a user of a client device of claim 1, the parsing step comprising identifying a first reference, wherein the first reference is a relative reference or an absolute reference relative to root, the method further comprising not modifying the first reference.

19. The method of providing transparent proxy services to a user of a client device of claim 1, the step of receiving the first unit of digital content from the remote server further comprising receiving a header from the remote server which is of a type which will cause the browser to load a new page, wherein the header includes a first reference including the remote server hostname;

the method further comprising modifying the first reference; and the method further comprising the proxy server transmitting the modified header to the browser.

20. The method of providing transparent proxy services to a user of a client device of claim 19, wherein the header comprises "Location".

21. The method of providing transparent proxy services to a user of a client device of claim 19, wherein the header comprises "Content-Location".

22. The method of providing transparent proxy services to a user of a client device of claim 1, wherein the step of receiving the first unit of digital content from the remote server further comprising receiving a header from the remote server which is of a type which will cause the browser to set a cookie, wherein the header includes a first reference including the remote server hostname;

the method further comprising modifying the first reference; and transmitting the modified header to the browser.

23. A proxy server for providing transparent proxy services to a user of a client device, the client device having a browser for retrieving digital content from a data network, wherein the client device, the proxy server and a remote server are connected to the data network, the remote server having a remote server host name, the proxy server comprising computer software code for:

receiving a first request from the browser for a first unit of digital content, wherein there is a remote server hostname associated with the remote server and the first request includes the remote server hostname for referencing the first unit of digital content;

requesting the first unit of digital content from the remote server;

receiving the first unit of digital content from the remote server;

parsing the first unit of digital content for references to the remote server;

identifying a first reference within a software construct, wherein the software construct, when performed, would force a page reload by the browser;

inserting a first software function into the modified remote page for modifying references;

inserting a call to the first software function into the software construct, wherein the first reference is encapsulated in the function call;

modifying at least one reference to the remote server in the first unit of digital content to form a modified first unit of digital content by inserting a surrogate server hostname into the at least one reference and removing a remote server hostname from the at least one reference, wherein the surrogate server hostname is different from the remote server hostname; and transmitting the modified first unit of digital content to the browser.

24. The proxy server for providing transparent proxy services to a user of a client device of claim 23, wherein there is a proxy server hostname associated with the proxy server, and the surrogate server hostname is the proxy server hostname.

25. The proxy server for providing transparent proxy services to a user of a client device of claim 23, the computer software code further for receiving a second request from the browser for a second unit of digital content, wherein the second request identifies the surrogate server hostname as a source of the second unit of digital content.

26. The proxy server for providing transparent proxy services to a user of a client device of claim 25, the proxy server further comprising computer software code for:

modifying the second request to a modified second request by removing the surrogate server hostname from the second request; and transmitting the modified second request to the remote server.

27. The proxy server for providing transparent proxy services to a user of a client device of claim 23, wherein the remote server comprises a web server and the data network utilizes TCP/IP and HTTP protocols, the computer software code for modifying comprising computer software code for appending the surrogate server hostname to the remote server hostname in the at least one reference.

28. The proxy server for providing transparent proxy services to a user of a client device of claim 23, wherein the remote server comprises a web server and the data network utilizes TCP/IP and HTTP protocols, wherein the at least one reference includes a local path, the computer software code for modifying comprising the computer software code for:

inserting the surrogate server hostname into the at least one reference in place of the remote server hostname; and making the remote server hostname server part of the local path of the at least one reference.

29. The proxy server for providing transparent proxy services to a user of a client device of claim 28, wherein the remote server hostname comprises plural characters, the computer software code for modifying further comprising computer software code for reversing the characters in the remote server hostname to thereby make the remote server hostname read backwards.

30. The proxy server for providing transparent proxy services to a user of a client device of claim 29, wherein the remote server hostname includes one or more periods the computer software code for modifying further comprising computer software code for changing the periods to slashes ("/") in the reversed remote server hostname.

31. The proxy server for providing transparent proxy services to a user of a client device of claim 29, the computer software code for modifying further comprising computer software code for inserting a separator between the reversed hostname of the remote server and the remainder of the path.

32. The proxy server for providing transparent proxy services to a user of a client device of claim 29 wherein the separator comprises a caret ("^").

33. The proxy server for providing transparent proxy services to a user of a client device of claim 23, further comprising computer software code for inserting a base reference tag pointing to the surrogate server into the modified remote page.

34. The proxy server for providing transparent proxy services to a user of a client device of claim 23, further comprising computer software code for determining if a base tag is present in the remote page, and if so, then modifying the base tag to point to the surrogate server by replacing the remote server hostname with the surrogate server hostname.

35. The proxy server for providing transparent proxy services to a user of a client device of claim 23, the computer software code for parsing comprising computer software code for identifying a first reference, wherein the first reference is to be displayed by the browser and therefore would be visible to the user, the proxy server further comprising computer software code for not modifying the first reference.

36. The proxy server for providing transparent proxy services to a user of a client device of claim 23, the computer software code for parsing comprising computer software code for:

identifying a first reference which is associated with any of the following

HTML tags:<SRC="">, <HREF="">, <ACTION="">, "<META CONTENT='#; URL'>"; and the computer software code for modifying comprising computer software code for modifying the first reference.

37. The proxy server for providing transparent proxy services to a user of a client device of claim 23, the computer software code for parsing comprising computer software code for identifying a first reference, wherein the first reference ends with an extension indicating that content identified by the first reference is binary data, the proxy server further comprising computer software code for not modifying the first reference.

38. The proxy server for providing transparent proxy services to a user of a client device of claim 23, the computer software code for parsing comprising computer software code for identifying a first reference, wherein the first reference includes a hostname other than the remote server hostname, the proxy server further comprising computer software code for not modifying the first reference.

39. The proxy server for providing transparent proxy services to a user of a client device of claim 23, the computer software code for parsing comprising computer software code for identifying a first reference, wherein the first reference includes a hostname other than the remote server hostname and the first reference comprises a link, the computer software code for modifying comprising computer software code for modifying the reference to provide an error message to the user if the user selects the link.

40. The proxy server for providing transparent proxy services to a user of a client device of claim 23, the computer software code for parsing comprising computer software code for identifying a first reference, wherein the first reference is a relative reference or an absolute reference relative to root, the proxy server further comprising computer software code for not modifying the first reference.

41. The proxy server for providing transparent proxy services to a user of a client device of claim 23, the computer software code for receiving the first unit of digital content from the remote server further comprising computer software code for:
receiving a header from the remote server which is of a type which will cause the browser to load a new page, wherein the header includes a first reference including the remote server hostname;
modifying the first reference; and
transmitting the modified header to the browser.

42. The method of providing transparent proxy services to a user of a client device of claim 41, wherein the header comprises "Location".

43. The method of providing transparent proxy services to a user of a client device of claim 41, wherein the header comprises "Content-Location".

44. The proxy server for providing transparent proxy services to a user of a client device of claim 23, wherein
the computer software code for receiving the first unit of digital content from the remote server further comprising computer software code for receiving a header from the remote server which is of a type which will cause the browser to set a cookie, wherein the header includes a first reference including the remote server hostname;
the proxy server further comprising computer software code for modifying the first reference; and
computer software code for transmitting the modified header to the browser.

45. A proxy server for providing transparent proxy services to a user of a client device, the client device having a browser for retrieving digital content from a data network, wherein the client device, the proxy server and a remote server are connected to the data network, the remote server having a remote server host name, the proxy server comprising:
means for receiving a first request from the browser for a first unit of digital content, wherein there is a remote server hostname associated with the remote server and the first request includes the remote server hostname for referencing the first unit of digital content;
means for requesting the first unit of digital content from the remote server;
means for receiving the first unit of digital content from the remote server;
means for parsing the first unit of digital content for references to the remote server;
means for identifying a first reference within a software construct, wherein the software construct, when performed, would force a page reload by the browser;
means for inserting a first software function into the modified remote page for modifying references;
inserting a call to the first software function into the software construct, wherein the first reference is encapsulated in the function call;
means for modifying at least one reference to the remote server in the first unit of digital content to form a modified first unit of digital content by inserting a surrogate server hostname into the at least one reference and removing a remote server hostname from the at least one reference, wherein the surrogate server hostname is different from the remote server hostname; and
means for transmitting the modified first unit of digital content to the browser.

46. The proxy server for providing transparent proxy services to a user of a client device of claim 45, wherein there is a proxy server hostname associated with the proxy server, and the surrogate server hostname is the proxy server hostname.

47. The proxy server for providing transparent proxy services to a user of a client device of claim 45 further comprising means for receiving a second request from the browser for a second unit of digital content, wherein the second request identifies the surrogate server hostname as a source of the second unit of digital content.

48. The proxy server for providing transparent proxy services to a user of a client device of claim 47, further comprising:
means for modifying the second request to a modified second request by removing the surrogate server hostname from the second request; and
means for transmitting the modified second request to the remote server.

49. The proxy server for providing transparent proxy services to a user of a client device of claim 45, wherein the remote server comprises a web server and the data network utilizes TCP/IP and HTTP protocols, the means for modifying comprising means for appending the surrogate server hostname to the remote server hostname in the at least one reference.

50. The proxy server for providing transparent proxy services to a user of a client device of claim 45, wherein the remote server comprises a web server and the data network utilizes TCP/IP and HTTP protocols, wherein the at least one reference includes a local path, the means for modifying comprising:
means for inserting the surrogate server hostname into the at least one reference in place of the remote server hostname; and
means for making the remote server hostname server part of the local path of the at least one reference.

51. The proxy server for providing transparent proxy services to a user of a client device of claim 50, wherein the remote server hostname comprises plural characters, the means for modifying further comprising means for reversing the characters in the remote server hostname to thereby make the remote server hostname read backwards.

52. The proxy server for providing transparent proxy services to a user of a client device of claim 51, wherein the remote server hostname includes one or more periods ("."), the means for modifying further comprising means for changing the periods to slashes ("/") in the reversed remote server hostname.

53. The proxy server for providing transparent proxy services to a user of a client device of claim 51, the means for modifying further comprising means for inserting a separator between the reversed hostname of the remote server and the remainder of the path.

54. The proxy server for providing transparent proxy services to a user of a client device of claim 51 wherein the separator comprises a caret ("^").

55. The proxy server for providing transparent proxy services to a user of a client device of claim 45, further comprising means for inserting a base reference tag pointing to the surrogate server into the modified remote page.

56. The proxy server for providing transparent proxy services to a user of a client device of claim 45, further comprising means for determining if a base tag is present in the remote page, and if so, then modifying the base tag to point to the surrogate server by replacing the remote server hostname with the surrogate server hostname.

57. The proxy server for providing transparent proxy services to a user of a client device of claim 45, the means for parsing comprising means for identifying a first reference, wherein the first reference is to be displayed by the browser and therefore would be visible to the user, the proxy server further comprising means for not modifying the first reference.

58. The proxy server for providing transparent proxy services to a user of a client device of claim 45:

the means for parsing comprising means for identifying a first reference which is associated with any of the following HTML tags:

<SRC="">, <HREF="">, <ACTION="">, "<META CONTENT='#;URL'"; and the means for modifying comprising means for modifying the first reference.

59. The proxy server for providing transparent proxy services to a user of a client device of claim 45, the means for parsing comprising means for identifying a first reference, wherein the first reference ends with an extension indicating that content identified by the first reference is binary data, the proxy server further comprising means for not modifying the first reference.

60. The proxy server for providing transparent proxy services to a user of a client device of claim 45, the means for parsing comprising means for identifying a first reference, wherein the first reference includes a hostname other than the remote server hostname, the proxy server further comprising means for not modifying the first reference.

61. The proxy server for providing transparent proxy services to a user of a client device of claim 45, the means for parsing comprising means for identifying a first reference, wherein the first reference includes a hostname other than the remote server hostname and the first reference comprises a link, the means for modifying comprising means for modifying the reference to provide an error message to the user if the user selects the link.

62. The proxy server for providing transparent proxy services to a user of a client device of claim 45, the means for parsing comprising means for identifying a first reference, wherein the first reference is a relative reference or an absolute reference relative to root, the proxy server further comprising means for not modifying the first reference.

63. The proxy server for providing transparent proxy services to a user of a client device of claim 45:

the means for receiving the first unit of digital content from the remote server further comprising means for receiving a header from the remote server which is of a type which will cause the browser to load a new page, wherein the header includes a first reference including the remote server hostname;

the proxy server further comprising means for modifying the first reference; and the proxy server further comprising means for transmitting the modified header to the browser.

64. The method of providing transparent proxy services to a user of a client device of claim 63, wherein the header comprises "Location".

65. The method of providing transparent proxy services to a user of a client device of claim 63, wherein the header comprises "Content-Location".

66. The proxy server for providing transparent proxy services to a user of a client device of claim 45, wherein the means for receiving the first unit of digital content from the remote server further comprising means for receiving a header from the remote server which is of a type which will cause the browser to set a cookie, wherein the header includes a first reference including the remote server hostname;

the proxy server further comprising means for modifying the first reference; and means for transmitting the modified header to the browser.

67. A computer readable medium having a computer program stored on a computer, thereon the computer program for providing transparent proxy services to a user of a client device, the client device having a browser for retrieving digital content from a data network, wherein the client device, the proxy server and a remote server are connected to the data network, the remote server having a remote server host name, the computer program, when executed causing:

receiving a first request from the browser for a first unit of digital content, wherein there is a remote server hostname associated with the remote server and the first request includes the remote server hostname for referencing the first unit of digital content;

requesting the first unit of digital content from the remote server;

receiving the first unit of digital content from the remote server;

parsing the first unit of digital content for references to the remote server;

identifying a first reference within a software construct, wherein the software construct, when performed, would force a page reload by the browser;

inserting a first software function into the modified remote page for modifying references;

instructions for inserting a call to the first software function into the software construct, wherein the first reference is encapsulated in the function call;

modifying at least one reference to the remote server in the first unit of digital content to form a modified first unit of digital content by inserting a surrogate server hostname into the at least one reference and removing a remote server hostname from the at least one reference, wherein the surrogate server hostname is different from the remote server hostname; and transmitting the modified first unit of digital content to the browser.

68. The computer program for providing transparent proxy services to a user of a client device of claim 67, wherein there is a proxy server hostname associated with the proxy server, and the surrogate server hostname is the proxy server hostname.

69. The computer program for providing transparent proxy services to a user of a client device of claim 67 further comprising instructions for receiving a second request from the browser for a second unit of digital content, wherein the second request identifies the surrogate server hostname as a source of the second unit of digital content.

70. The computer program for providing transparent proxy services to a user of a client device of claim 69 further comprising instructions for:

modifying the second request to a modified second request by removing the surrogate server hostname from the second request; and transmitting the modified second request to the remote server.

71. The computer program for providing transparent proxy services to a user of a client device of claim 67, wherein the remote server comprises a web server and the data network utilizes TCP/IP and HTTP protocols, the instructions for modifying comprising instructions for appending the surrogate server hostname to the remote server hostname in the at least one reference.

72. The computer program for providing transparent proxy services to a user of a client device of claim 67, wherein the remote server comprises a web server and the data network utilizes TCP/IP and HTTP protocols, wherein the at least one reference includes a local path, the instructions for modifying comprising instructions for:

inserting the surrogate server hostname into the at least one reference in place of the remote server hostname; and making the remote server hostname server part of the local path of the at least one reference.

73. The computer program for providing transparent proxy services to a user of a client device of claim 72, wherein the remote server hostname comprises plural characters, the instructions for modifying further comprising instructions for reversing the characters in the remote server hostname to thereby make the remote server hostname read backwards.

74. The computer program for providing transparent proxy services to a user of a client device of claim 72, wherein the remote server hostname includes one or more periods ("."), the instructions for modifying further comprising instructions for changing the periods to slashes ("/") in the reversed remote server hostname.

75. The computer program for providing transparent proxy services to a user of a client device of claim 72, the instructions for modifying further comprising instructions for inserting a separator between the reversed hostname of the remote server and the remainder of the path.

76. The computer program for providing transparent proxy services to a user of a client device of claim 75 wherein the separator comprises a caret ("^").

77. The computer program for providing transparent proxy services to a user of a client device of claim 67 further comprising instructions for inserting a base reference tag pointing to the surrogate server into the modified remote page.

78. The computer program for providing transparent proxy services to a user of a client device of claim 67 further comprising instructions for determining if a base tag is present in the remote page, and if so, then modifying the base tag to point to the surrogate server by replacing the remote server hostname with the surrogate server hostname.

79. The computer program for providing transparent proxy services to a user of a client device of claim 67, the instructions for parsing comprising instructions for identifying a first reference, wherein the first reference is to be displayed by the browser and therefore would be visible to the user, the computer program further comprising instructions for not modifying the first reference.

80. The computer program for providing transparent proxy services to a user of a client device of claim 67, the instructions for parsing comprising instructions for:

identifying a first reference which is associated with any of the following

HTML tags:<SRC="">, <HREF="", <ACTION="">, "<META CONTENT='#;URL'>"; and the instructions for modifying comprising instructions for modifying the first reference.

81. The computer program for providing transparent proxy services to a user of a client device of claim 67, the instructions for parsing comprising instructions for identifying a first reference, wherein the first reference ends with an extension indicating that content identified by the first reference is binary data, the computer program further comprising instructions for not modifying the first reference.

82. The computer program for providing transparent proxy services to a user of a client device of claim 67, the instructions for parsing comprising instructions for identifying a first reference, wherein the first reference includes a hostname other than the remote server hostname, the computer program further comprising instructions for not modifying the first reference.

83. The computer program for providing transparent proxy services to a user of a client device of claim 67, the instructions for parsing comprising instructions for identifying a first reference, wherein the first reference includes a hostname other than the remote server hostname and the first reference comprises a link, the instructions for modifying comprising instructions for modifying the reference to provide an error message to the user if the user selects the link.

84. The computer program for providing transparent proxy services to a user of a client device of claim 67, the instructions for parsing comprising instructions for identifying a first reference, wherein the first reference is a relative reference or an absolute reference relative to root, the computer program further comprising instructions for not modifying the first reference.

85. The computer program for providing transparent proxy services to a user of a client device of claim 67, the instructions for receiving the first unit of digital content from the remote server further comprising instructions for:

receiving a header from the remote server which is of a type which will cause the browser to load a new page, wherein the header includes a first reference including the remote server hostname;

modifying the first reference; and transmitting the modified header to the browser.

86. The computer program for providing transparent proxy services to a user of a client device of claim 85, wherein the header comprises "Location".

87. The computer program for providing transparent proxy services to a user of a client device of claim 85, wherein the header comprises "Content-Location".

88. The computer program for providing transparent proxy services to a user of a client device of claim 67, wherein the instructions for receiving the first unit of digital content from the remote server further comprising instructions for receiving a header from the remote server which is of a type which will cause the browser to set a cookie, wherein the header includes a first reference including the remote server hostname;

the computer program further comprising instructions for modifying the first reference; and instructions for transmitting the modified header to the browser.

* * * * *

UNITED STATES PATENT AND TRADEMARK OFFICE
CERTIFICATE OF CORRECTION

PATENT NO.       : 7,305,473 B2                                         Page 1 of 1
APPLICATION NO.  : 09/819521
DATED            : December 4, 2007
INVENTOR(S)      : David Vogt It is certified that error appears in the above-identified patent and that said Letters Patent is hereby corrected as shown below:

*In claim 30, column 12, line 18, "periods the" should read --periods ("."), the--.

In claim 58, column 15, line 39, "CONTENT='#;URL'"; and" should read --CONTENT='#;URL'>"; and--.

In claim 76, column 17, line 60, "(" $\hat{0}$ ")." should read --("^")--.

Signed and Sealed this

Thirteenth Day of May, 2008

JON W. DUDAS
*Director of the United States Patent and Trademark Office*